US011167855B2

(12) United States Patent
Kestler et al.

(10) Patent No.: US 11,167,855 B2
(45) Date of Patent: Nov. 9, 2021

(54) METHOD AND APPARATUS FOR AIRCRAFT ANTI-ICING

(71) Applicant: ROHR, INC., Chula Vista, CA (US)

(72) Inventors: Steven M Kestler, San Diego, CA (US); Sarah Lohman, San Diego, CA (US); Manuel Muñoz, Mexicali (MX); Xiaolan Hu, San Diego, CA (US); Jay Francisco, Chula Vista, CA (US); Vijay V Pujar, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 295 days.

(21) Appl. No.: 16/399,561

(22) Filed: Apr. 30, 2019

(65) Prior Publication Data
US 2020/0346764 A1 Nov. 5, 2020

(51) Int. Cl.
B64D 15/04 (2006.01)
B64D 29/00 (2006.01)

(52) U.S. Cl.
CPC ............. B64D 15/04 (2013.01); B64D 29/00 (2013.01)

(58) Field of Classification Search
CPC .......... B64D 15/04; A45D 20/12; F04F 5/461
See application file for complete search history.

(56) References Cited

U.S. PATENT DOCUMENTS 2,488,467 A * 11/1949 De Lisio Salvatore .. F04F 5/16
239/561
3,749,336 A 7/1973 Christensen et al.
4,351,150 A 9/1982 Schulze
4,688,745 A 8/1987 Rosenthal
5,649,370 A * 7/1997 Russo .................... A45D 20/12
34/97
6,267,328 B1 7/2001 Vest
8,757,547 B2 6/2014 Porte et al.
9,927,136 B2 * 3/2018 Staniforth ................ F24F 6/14
9,950,799 B2 4/2018 Anderson et al.
10,138,811 B2 11/2018 Gally et al.
10,167,086 B2 1/2019 Newman et al.
2002/0179773 A1 12/2002 Breer et al.
2003/0079366 A1 5/2003 Chang
(Continued)

FOREIGN PATENT DOCUMENTS

EP 2204320 7/2010
EP 2918809 9/2015
(Continued)

OTHER PUBLICATIONS

European Patent Office, European Search Report dated May 18, 2020 in Application No. 19216718.7.
(Continued)

Primary Examiner — Christopher D Hutchens
(74) Attorney, Agent, or Firm — Snell & Wilmer L.L.P.

(57) ABSTRACT

An apparatus for aircraft anti-icing includes a nozzle head including an inner wall and an outer wall, the inner wall defining a through-hole extending through the nozzle, the outer wall circumscribing the inner wall, wherein a plenum is disposed between the inner wall and the outer wall, and a neck extending from the outer wall of the nozzle head, the neck configured to supply a flow of hot gas to the plenum, wherein a maximum width of the inner surface of the neck is less than a maximum width of the through-hole.

20 Claims, 11 Drawing Sheets

(56) References Cited

U.S. PATENT DOCUMENTS

| | | |
|---|---|---|
| 2004/0083620 A1 | 5/2004 | McCambridge et al. |
| 2010/0150699 A1 | 6/2010 | Nicolas et al. |
| 2010/0226764 A1* | 9/2010 | Gammack ............... F04D 29/403 415/182.1 |
| 2010/0226787 A1* | 9/2010 | Gammack ............... F24F 13/32 416/246 |
| 2011/0277335 A1* | 11/2011 | Prehodka ............... A45D 20/12 34/96 |
| 2012/0260516 A1 | 10/2012 | Han et al. |
| 2013/0111777 A1 | 5/2013 | Jeong |
| 2013/0327012 A1 | 12/2013 | Mahabub et al. |
| 2015/0024674 A1* | 1/2015 | McGregor ............... F04D 25/08 454/258 |
| 2015/0086333 A1 | 3/2015 | Schnoebelen et al. |
| 2015/0198061 A1* | 7/2015 | Johnson ............... F02C 7/047 60/779 |
| 2015/0260099 A1 | 9/2015 | Gally et al. |
| 2015/0291284 A1 | 10/2015 | Victor et al. |
| 2016/0017751 A1 | 1/2016 | Caruel |
| 2016/0257413 A1 | 9/2016 | Newman et al. |
| 2017/0057643 A1 | 3/2017 | Frank et al. |
| 2017/0058772 A1 | 3/2017 | Frank et al. |
| 2017/0166313 A1 | 6/2017 | Saeed |
| 2018/0194485 A1* | 7/2018 | Chilukuri ............... B64D 15/04 |
| 2019/0127065 A1* | 5/2019 | Capunay ............... B64C 29/0075 |
| 2019/0309683 A1* | 10/2019 | Mackin ............... B64D 33/02 |
| 2020/0140098 A1* | 5/2020 | Radhakrishnan ...... B64D 15/04 |
| 2020/0346766 A1* | 11/2020 | Lohman ............... B64D 15/04 |
| 2020/0346767 A1* | 11/2020 | Pujar ............... B64D 15/04 |

FOREIGN PATENT DOCUMENTS

| | | |
|---|---|---|
| FR | 2953254 | 6/2011 |
| KR | 20140017453 | 2/2014 |
| WO | 9810677 | 3/1998 |

OTHER PUBLICATIONS

European Patent Office, European Search Report dated Jun. 3, 2020 in Application No. 19216738.5.

European Patent Office, European Search Report dated Jun. 3, 2020 in Application No. 19216725.2.

\* cited by examiner

METHOD AND APPARATUS FOR AIRCRAFT ANTI-ICING

FIELD

The present disclosure relates to anti-icing systems for aircraft jet engine propulsion systems, and more particularly to nozzles for anti-icing systems.

BACKGROUND

The formation of ice on aircraft wings, propellers, air inlets of engines, etc. adds considerable weight, and changes the airfoil or inlet configuration, which may make the aircraft more difficult to fly and in some cases has caused loss of aircraft. In the case of jet aircraft, large pieces of ice breaking loose from the leading edge of an engine inlet housing can damage rotating turbine blades or other internal engine components and cause engine failure.

Typical anti-ice techniques include the ducting of hot gases into a housing adjacent to the likely icing area. Current techniques to solve this problem generally fall into one of two types of systems: Impingement style ring systems or swirl nozzle systems. In each case, the hot gas conduits simply dump hot gases into a housing, such as the leading edge of a jet engine housing or a wing leading edge. While often useful, these systems may not be fully effective due to the low quantity of hot gases introduced relative to the mass of air in the housing, the heating effect tending to be limited to the region near the hot gas introduction point, and the complexity of the hot gas duct system.

SUMMARY

An apparatus for aircraft anti-icing is disclosed, the apparatus comprising a nozzle head including an inner wall and an outer wall, the inner wall defining a through-hole extending through the nozzle head, the outer wall circumscribing the inner wall, wherein a plenum is disposed between the inner wall and the outer wall, and a neck extending from the outer wall of the nozzle head, the neck configured to supply a flow of hot gas to the plenum, wherein a maximum width of the neck is less than a maximum width of the through-hole.

In various embodiments, the inner wall and the outer wall each comprise a corrugated geometry.

In various embodiments, the apparatus further comprises a bifurcation structure extending from the inner wall into the neck, the bifurcation structure configured to divide the flow of hot gas into a first flow of hot gas and a second flow of hot gas, wherein the first flow of hot gas is directed in a first rotational direction around the plenum and the second flow of hot gas is directed in a second rotational direction around the plenum.

In various embodiments, the apparatus further comprises a plurality of fins disposed in the plenum and extending from at least one of the inner wall and the outer wall, wherein the plurality of fins are configured to impart a rotational flow as the flow of hot gas moves through the plenum.

In various embodiments, the plurality of fins comprises a first plurality of fins extending from the inner wall and a second plurality of fins extending from the outer wall, the first plurality of fins is spaced apart from the outer wall and the second plurality of fins is spaced apart from the inner wall.

In various embodiments, the plurality of fins protrude from the plenum.

In various embodiments, a centerline axis of the nozzle head is oriented at a non-orthogonal angle with respect to an exit plane of the nozzle head.

In various embodiments, the apparatus further comprises a first lip extending from the inner wall and a second lip extending from the outer wall, the first lip and the second lip configured turn the flow of hot gas exiting the nozzle head.

In various embodiments, the first lip and the second lip turn the flow of hot gas exiting the nozzle head to be orthogonal to an exit plane of the nozzle head.

In various embodiments, the inner wall and the outer wall comprise an airfoil geometry.

In various embodiments, the neck is configured to receive the flow of hot gas from a compression stage of an engine and the apparatus is configured to provide at least a portion of the flow of hot gas to a leading edge housing of an aircraft component.

In various embodiments, the nozzle head further includes a second inner wall and a second outer wall, the second inner wall defining a second through-hole extending through the nozzle head, the second outer wall circumscribing the second inner wall, and the second outer wall intersecting the outer wall.

An aircraft anti-icing system is disclosed, comprising a source of a high temperature gas, a housing, a conduit configured to carry the high temperature gas from the source to the housing, and a nozzle coupled to the conduit. The nozzle comprises a nozzle head including an inner wall and an outer wall, the inner wall defining a through-hole extending through the nozzle, the outer wall circumscribing the inner wall, wherein a plenum is disposed between the inner wall and the outer wall, and a neck extending from the outer wall of the nozzle head, the neck configured to supply the high temperature gas to the plenum, and the high temperature gas exits the nozzle via the plenum, wherein a maximum width of the neck is less than a maximum width of the through-hole.

In various embodiments, the aircraft anti-icing system further comprises a port for exhausting air from the housing, wherein the high temperature gas mixes with air from the housing after the high temperature gas exits the nozzle, and the nozzle is configured to increase a speed of the high temperature gas exiting the nozzle.

In various embodiments, the inner wall is coupled to the outer wall at an upstream end of the nozzle, the high temperature gas exits the nozzle at a downstream end of the nozzle.

In various embodiments, a centerline axis of the nozzle head is orthogonal to an exit plane of the nozzle head, and the exit plane of the nozzle head is oriented at an angle with respect to a direction of a flow of ambient air within the housing at the exit plane.

In various embodiments, a centerline axis of the nozzle head is orthogonal to an exit plane of the nozzle head, and the exit plane of the nozzle head is oriented at an angle with respect to a tangential direction of the housing at the exit plane.

In various embodiments, a centerline axis of the nozzle head is at a non-orthogonal angle with respect to an exit plane of the nozzle head.

A method for preventing formation of ice is disclosed, the method comprising receiving, at a nozzle, a hot gas from a compression stage of an engine, and providing, via a nozzle head, the hot gas received from the compression stage to an internal volume of a leading edge housing, wherein the nozzle head provides the hot gas based on a flow pattern, wherein the flow pattern is determined based, at least in part, on a geometry of the nozzle head that has an inner wall and an outer wall, wherein the inner wall defines a through-hole that passes through the nozzle head, and wherein the hot gas passes between the inner wall and the outer wall, wherein a neck extends from the outer wall whereby the nozzle head receives the hot gas, a maximum width of the neck is less than a maximum width of the through-hole.

In various embodiments, the method further comprises exhausting the hot gas from the housing.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading and/or crosshatching lines may be used throughout the figures to denote different parts, but not necessarily to denote the same or different materials.

An anti-icing system of the present disclosure may provide an improved swirling rotational anti-icing system for a leading edge housing, such as the nose cowl of a transport aircraft jet engine, which enhances the mixing of injected hot, high pressure gas with the larger mass of air within the leading edge housing. An anti-icing system of the present disclosure may further improve the mixing of hot, high pressure gas with the mass of air within the leading edge housing and thereby materially reduce any tendency for the injection of such hot, high pressure gas to create an area of elevated temperature in the leading edge housing at a position downstream of the injection of such hot gas under severe operating condition.

Various embodiments of the present disclosure may enhance the circumference uniformity of nose lip temperature and nose lip heat rejection to improve the anti-icing efficiency and to prevent ice accumulation on the exterior of the nose lip upstream of the point of hot gas injection.

Figure 1:
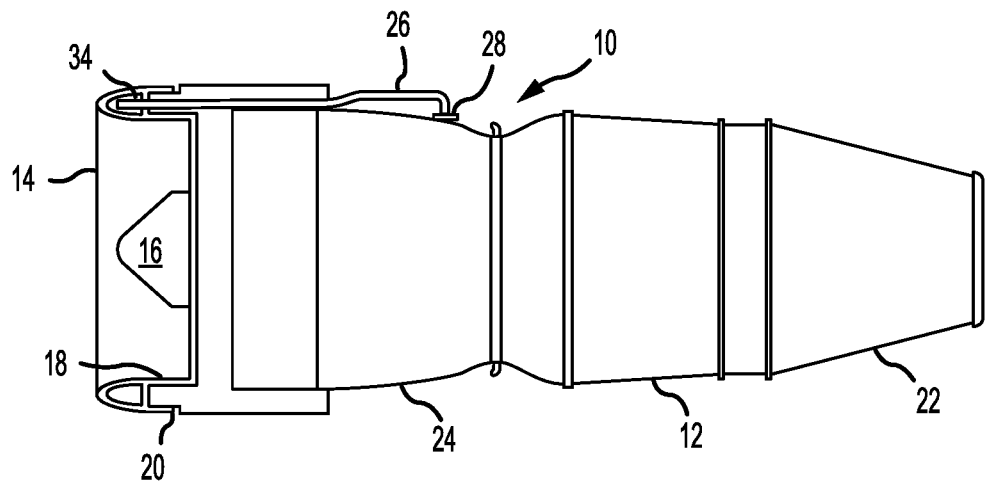
FIG. 1 illustrates a schematic representation of a typical jet turbine engine, in accordance with various embodiments.

With reference to FIG. 1, there is seen a schematic representation of a jet turbine engine 10 of the type suitable for aircraft propulsion. The turbine engine 10 is housed within a central housing 12. Air enters the engine 10 through an air inlet section 20, between the spinner 16 of the engine and the nose lip or annular single skin housing 14 which constitutes the forward most section of the air inlet 20 of the engine nacelle, though it is noted that certain components have been omitted from the figure for simplicity. Engine thrust is produced by mixing incoming air and fuel to form a combustible mixture within the central housing 12 and passing the hot, high pressure exhaust gases through exhaust outlet 22 and out the rear of the engine.

In flight, ice may tend to form on the nose lip 14 (in addition to other leading edge housing aircraft components omitted for simplicity). The ice changes the geometry of the inlet area 18 between the nose lip 14 and the spinner 16, adversely affecting the quantity, flow path and quality of incoming air. Also, pieces of ice may periodically break free from these components and enter the engine, damaging rotor blades and other internal engine components.

Figure 2:
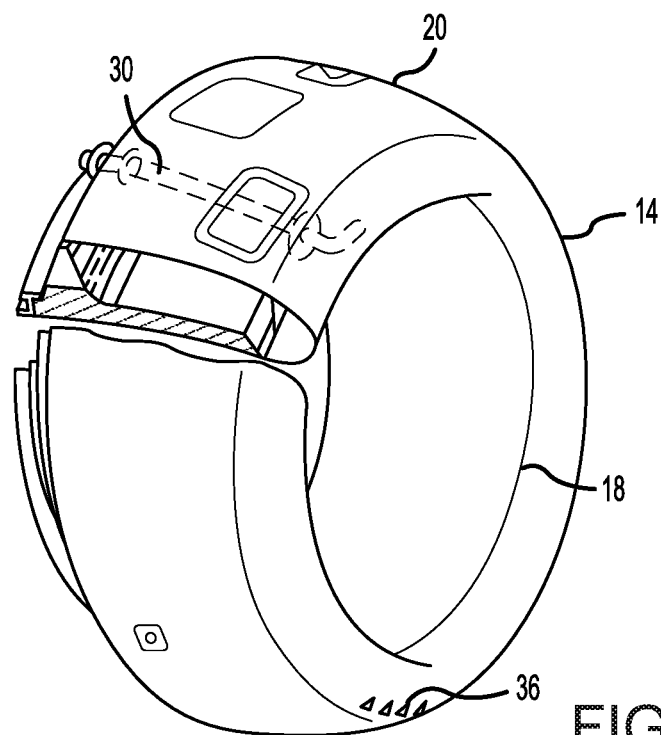
FIG. 2 illustrates a schematic view of a jet engine inlet, in accordance with various embodiments.
Figure 3:
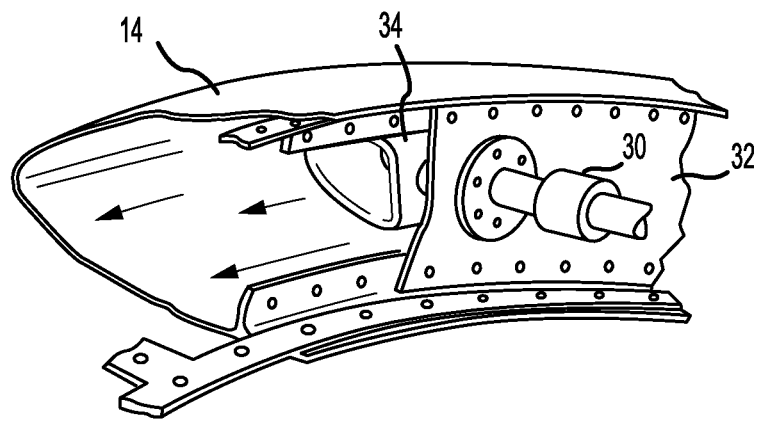
FIG. 3 illustrates a perspective view, partially in section, of an outlet nozzle installed in a leading edge housing, in accordance with various embodiments.

With combined reference to FIG. 1, FIG. 2, and FIG. 3, within the compressor section 24 of the jet engine 10 there is a region containing hot gases. A suitable conduit 26 or tube is connected at a first end 28 to that hot region. In various embodiments, the hot region is the environmental bleed air manifold although in other embodiments the hot region may be any other hot air source such as the compressor discharge bleed air manifold. The other end 30 penetrates a bulkhead 32 that substantially closes the nose lip 14 to form the D-duct to enclose a quantity of air with the annular space created by such bulkhead 32 and the nose lip 14.

The conduit 26 carrying the hot, high pressure gas from the compressor section of a jet engine 10 extends through the bulkhead 32 that closes off the annular nose lip 14 of the inlet 18 to create an annular chamber filled with air. The conduit 26 has an outlet nozzle 34 connected to its outlet end. The outlet nozzle 34 directs the hot gas around the circumference of the annular chamber.

Outlet nozzle 34 may be made from a metallic material suitable to withstand high temperature gasses, for example from compressor section 24 of the jet engine 10. In various embodiments, outlet nozzle 34 may comprise one of a steel, a stainless steel, a tungsten carbide, a titanium, a titanium alloy, a nickel, nickel alloy, a nickel steel (e.g., an austenitic nickel-chromium-based alloy such as that available under the trade name INCONEL), or any other material suitable to withstand high temperature gasses from compressor section 24.

In various embodiments, outlet nozzle 34 is additively manufactured. As used herein, the term "additive manufacturing" encompasses any method or process whereby a three-dimensional object is produced by creation of a substrate or material to an object, such as by addition of successive layers of a material to an object to produce a manufactured product having an increased mass or bulk at the end of the additive manufacturing process than the beginning of the process. In contrast, traditional manufacturing (e.g., forms of subtractive manufacturing) by machining or tooling typically relies on material removal or subtractive processes, such as cutting, lathing, drilling, grinding, and/or the like, to produce a final manufactured object that has a decreased mass or bulk relative to the starting workpiece. Other traditional manufacturing methods includes forging or casting, such as investment casting, which utilizes the steps of creating a form, making a mold of the form, and casting or forging a material (such as metal) using the mold. As used herein, the term "additive manufacturing" should not be construed to encompass fabrication or joining of previously formed objects.

A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, and digital light processing. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, are intended to be included within the scope of the present disclosure. In this regard, outlet nozzle 34 is a monolithic structure, in accordance with various embodiments. In various embodiments, outlet nozzle 34 is a combination of monolithic sub-structures that are joined together, for example via welding, fasteners, or a threaded connection, among others.

In operation, outlet nozzle 34 may turn the flow of hot gas substantially 90 degrees so that the outlet of outlet nozzle 34 directs the flow of hot gas approximately tangent to the centerline of the annular nose lip 14. In various embodiments, the outlet of outlet nozzle 34 directs the flow of hot gas in a direction more or less than tangent to the centerline of the annular nose lip 14.

It will be recognized that the injection of the hot gas stream into the housing air will cause the entrained mass of air to rotate within the nose lip 14 in a rotational direction. Also, as seen in FIG. 2, as the mass of entrained air rotates within the nose lip 14 a suitable exhaust means, shown as suitably sized holes 36 formed in an outboard position of the nose lip 14, permit a portion of such entrained air to escape the nose lip 14 equal to the mass flow rate of hot gas being injected into the nose lip 14 to maintain an equilibrium of flow. In various embodiments holes 36 may be located in other areas including but not limited to the rear of housing 14.

It will be recognized that as the hot gas is emitted from the nozzle 34 the hot gases rapidly mix with the ambient air in the nose lip 14, to rapidly reach a temperature intermediate between the entering hot gas temperature and that of the ambient air. The temperature of the air within the nose lip 14 will continue to rise until an equilibrium condition is reached. As the temperature in the nose lip 14 rises higher amounts of energy will be lost through the skin in the form of conduction and will be lost in the air leaving the nose lip 14. When the amount of energy leaving the nose lips 14 equals the amount entering then the temperature will hold steady at a maximum temperature. With the nozzle 34 and the enhanced mixing of the hot, high pressure gas and the air contained within the nose lip 14, any tendency of the rotating heated air mass to generate a localized area of elevated temperature in the skin of the nose lip 14 will be materially reduced.

In various embodiments, the conduit 30 carries hot, high pressure gas from the jet engine 10 to a leading edge housing of other aircraft components, such as a wing for example. In this regard, outlet nozzle 34 may be used for anti-ice systems associated with other aircraft components without departing from the scope or spirit of the present disclosure. Outlet nozzle 34 may be configured to increase a speed of the hot gas exiting the outlet nozzle 34.

Figure 4A:
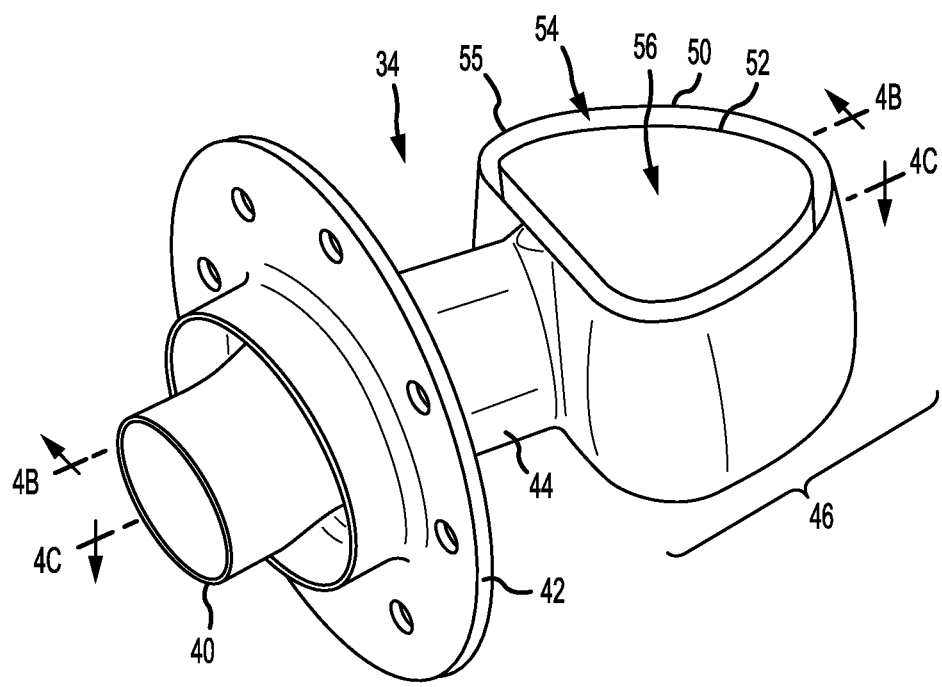
FIG. 4A illustrates a perspective view of an outlet nozzle having an inner wall and an outer wall, the inner wall defining a through-hole and a plenum disposed between the inner wall and outer wall, in accordance with various embodiments.
Figure 4B:
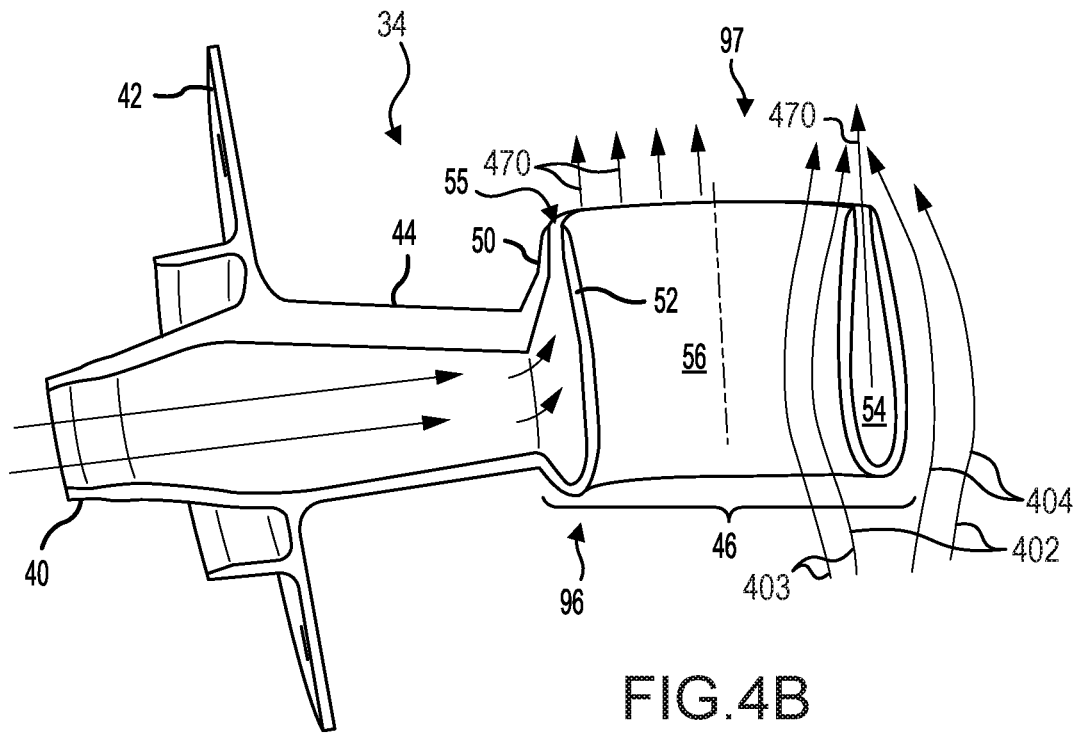
FIG. 4B illustrates a section view of the outlet nozzle of FIG. 4A, in accordance with various embodiments.
Figure 4C:
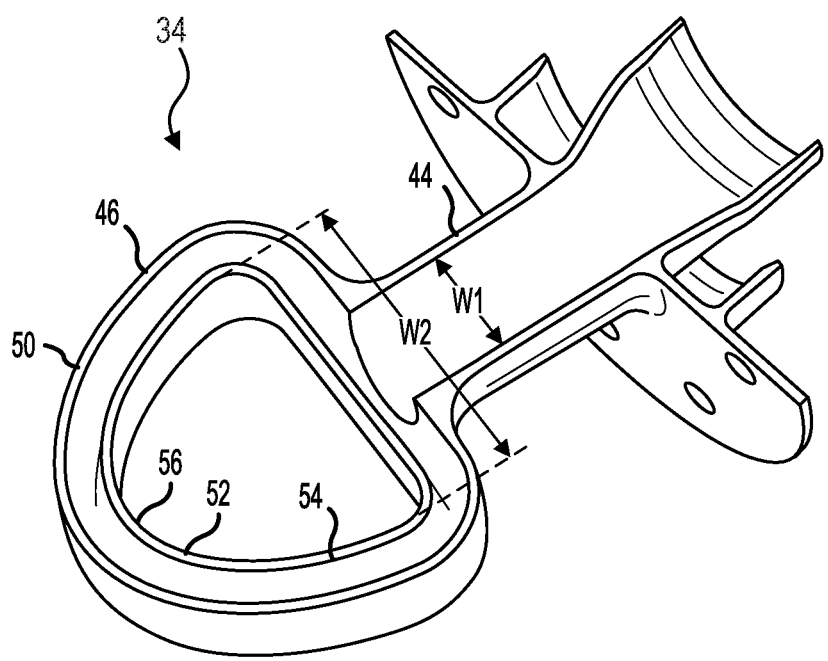
FIG. 4C illustrates a section view of the outlet nozzle of FIG. 4A, in accordance with various embodiments.

With combined reference to FIG. 4A, FIG. 4B, and FIG. 4C, outlet nozzle 34 comprises an inlet 40 whereby the hot gas enters outlet nozzle 34 and a head 46 (also referred to herein as a nozzle head) whereby the hot gas exits outlet nozzle 34. Outlet nozzle 34 may comprise a flange 42 whereby outlet nozzle 34 is secured to bulkhead 32. Outlet nozzle 34 may comprise a neck 44 whereby the hot gas is routed to the head 46 of outlet nozzle 34. Flange 42 may extend from neck 44.

In various embodiments, the concentric geometry or design of head 46 generates a diffuse flow pattern that provides enhanced and efficient mixing of the flow stream emitted by outlet nozzle 34 with the gases included in the internal volume of the annular chamber defined between the bulkhead 32 and the annular nose lip 14. In this way, the flow pattern generated by the concentric geometry of outlet nozzle 34 may minimize the temperature of the hot spot associated with the annular nose lip 14 that includes outlet nozzle 34.

In various embodiments, head 46 comprises an outer wall 50 and an inner wall 52. Outer wall 50 may surround and/or circumscribe inner wall 52. In various embodiments, outer wall 50 is concentric with inner wall 52. Inner wall 52 defines a through-hole or aperture 56 extending through head 46. Inner wall 52 may surround and/or circumscribe aperture 56. A plenum 54 is disposed between inner wall 52 and outer wall 50 whereby the hot gasses are routed through outlet nozzle 34. An exit 55 may be formed by inner wall 52 and outer wall 50 of head 46 at the downstream end 97 of head 46 whereby hot gas exits plenum 54. In various embodiments, exit 55 may be a slotted opening extending along a perimeter of head 46. Inner wall 52 and outer wall 50 may intersect, forming a closed end, at the upstream end 96 of head 46. Exit 55 may be a slit defined between inner wall 52 and outer wall 50. In various embodiments, plenum 54 comprises an annular geometry. Neck 44 may be coupled to outer wall 50 of head 46. In this regard, neck 44 may extend from outer wall 50. The flow of ambient air 402 within nose lip 14 may flow around outlet nozzle 34 via a first path 403 through aperture 56 or a second path 404 across outer wall 50. In this manner, the flow of hot gas 470 exiting at the slit 55 of outlet nozzle 34, via plenum 54, is more efficiently diffused with the flow of ambient air 402.

In various embodiments, inner wall 52 and outer wall 50 form an airfoil geometry (see FIG. 4B) to increase the aerodynamic efficiency of outlet nozzle 34. The airfoil geometry may reduce the drag of outlet nozzle 34.

In various embodiments, the maximum width W1 (measured orthogonal to the flow of gas through neck 44 and orthogonal the centerline axis of head 46) of the inner surface of neck 44 may be less than the maximum width W2 of through-hole or aperture 56. In various embodiments, width W1 is less than one half of width W2. In various embodiments, width W1 is less than three fourths of width W2. In this manner, the neck 44 tends to minimally impede the flow of ambient air flowing around outlet nozzle 34. In this manner, aperture 56 entrains an increased amount of ambient air flowing across head 46 to enhance the mixing efficiency with hot gasses exiting outlet nozzle 34.

Figure 5:
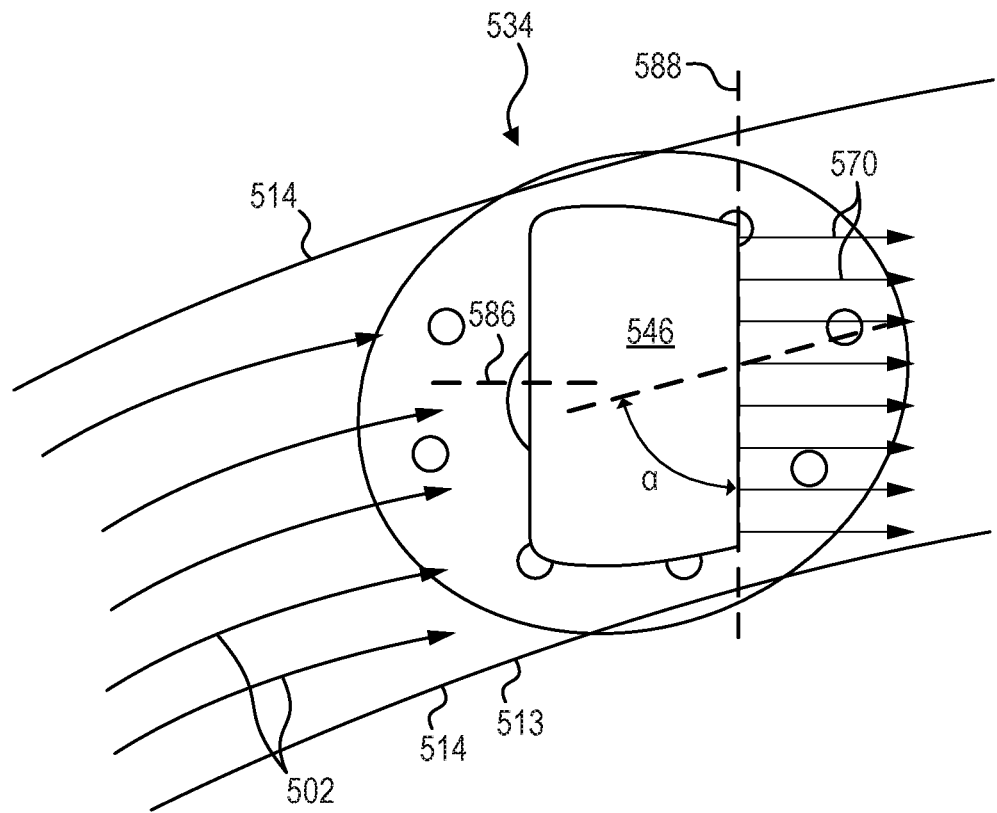
FIG. 5 illustrates a schematic view of an outlet nozzle installed in a leading edge housing, the outlet nozzle oriented at an angle with respect to a tangential direction of the leading edge housing, in accordance with various embodiments.

With reference to FIG. 5, an outlet nozzle 534 is illustrated in operation with respect to a lip skin 514. In various embodiments, outlet nozzle 534 is similar to outlet nozzle 34 of FIG. 4A. A centerline axis 586 of outlet nozzle 534 may be orthogonal to an exit plane 588 of outlet nozzle 534. In various embodiments, the exit plane 588 of outlet nozzle 534 may be oriented at an angle α with respect to the tangential direction of lip skin 514 at the exit plane 588. In various embodiments, the exit plane 588 of outlet nozzle 534 may be oriented at an angle α with respect to the direction of the flow of ambient air 502 at the exit plane 588. In various embodiments, angle α is between forty-five degree and ninety-degrees (45°-90°). In various embodiments, angle α is between forty-five degree and eighty-nine degrees (45°-89°). In various embodiments, angle α is between fifty-five degree and eighty-five degrees (55°-85°). In various embodiments, angle α is between sixty-five degree and eighty-degrees (65°-80°). The flow of hot gas 570 may exit outlet nozzle 534 in a direction perpendicular to the exit plane 588. In this regard, the flow of hot gas 570 may exit outlet nozzle 534 at the angle α with respect to the direction of flow of ambient air 502 within nose lip 514, enhancing the mixing of the flow of hot gas 570 with the flow of ambient air 502. Outlet nozzle 534 may be angled toward the proximal surface 513 of nose lip 514.

Figure 6A:
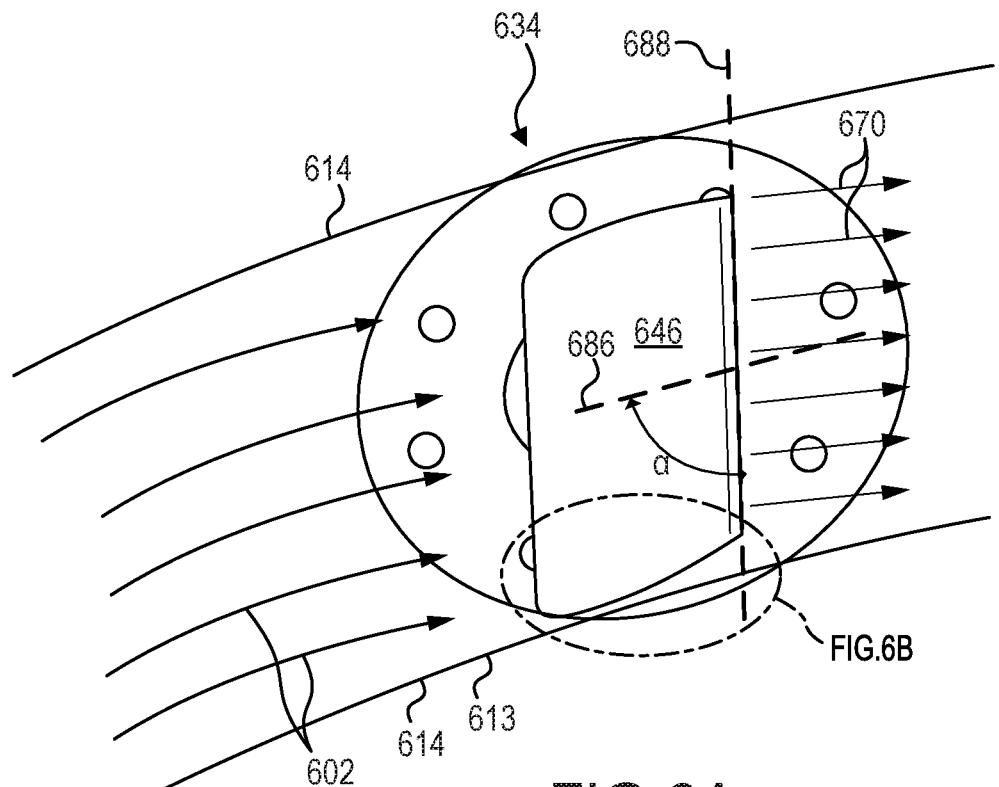
FIG. 6A illustrates a schematic view of an askew outlet nozzle installed in a leading edge housing, the exit plane of the askew outlet nozzle oriented at an angle with respect to a tangential direction of the leading edge housing, in accordance with various embodiments.

With reference to FIG. 6A, an askew outlet nozzle 634 is illustrated in operation with respect to a lip skin 614. In various embodiments, askew outlet nozzle 634 is similar to outlet nozzle 34 of FIG. 4A, except that askew outlet nozzle 634 is formed in an askew geometry. In this regard, a centerline axis 686 of askew outlet nozzle 634 may be oriented at a non-orthogonal angle α with respect to an exit plane 688 of askew outlet nozzle 634. In various embodiments, exit plane 688 of askew outlet nozzle 634 is oriented at angle α with respect to the tangential direction of lip skin 614 at the exit plane 688. The flow of hot gas 670 may exit askew outlet nozzle 634 in a direction perpendicular to the exit plane 688. In this regard, the flow of hot gas 670 may exit askew outlet nozzle 634 at the angle α with respect to the direction of flow of ambient air 602 within nose lip 614, enhancing the mixing of the flow of hot gas 670 with the flow of ambient air 602. Askew outlet nozzle 634 may be angled toward the proximal surface 613 of nose lip 614.

Figure 6B:
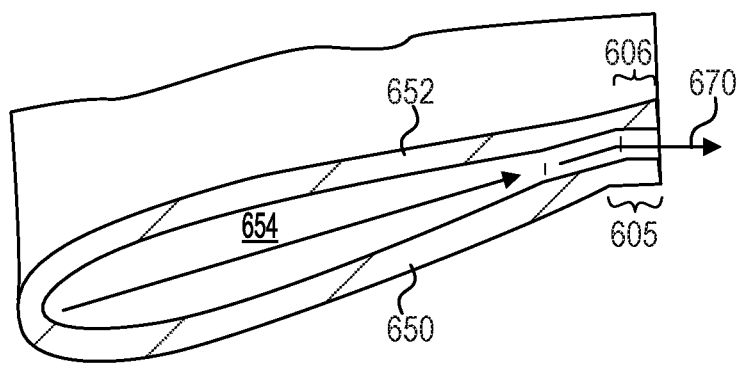
FIG. 6B illustrate a section view of the askew outlet nozzle of FIG. 6A, the inner wall and the outer wall each comprising a lip extending therefrom for turning the flow of hot gas to be orthogonal to the exit plane of the askew outlet nozzle, in accordance with various embodiments.

With combined reference to FIG. 6A and FIG. 6B, and appreciating that the head 646 is oriented askew with respect to the exit plane 688 of head 646, concentric flanges or lips—i.e., lip 605 and lip 606—may extend from outer wall 650 and inner wall 652, respectively to turn the flow of hot gas 670 exiting askew outlet nozzle 634 to be orthogonal to exit plane 688. In this manner, the flow of hot gas 670 exits askew outlet nozzle 634 at an angle with respect to the direction of flow of ambient air 602, while mitigating impedance of the flow of ambient air 602 by the structure of askew outlet nozzle 634. The flow of hot gas 670 may travel through plenum 654 at a first angle (i.e., angle α) with respect to exit plane 688, and the flow of hot gas 670 may be turned by lips 605, 606 to a second angle (e.g., orthogonal) with respect to exit plane 688.

Figure 7:
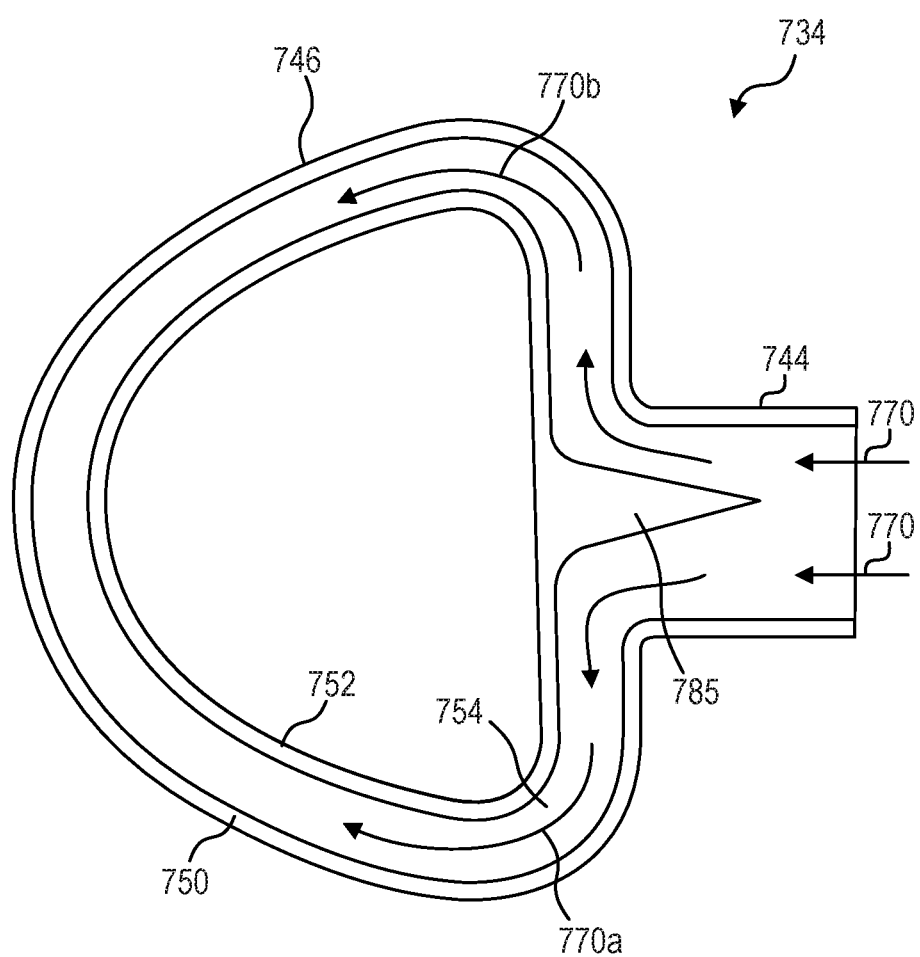
FIG. 7 illustrates a schematic, section view of an outlet nozzle having a bifurcation member, in accordance with various embodiments.

With reference to FIG. 7, a cross-section view of an outlet nozzle 734 is illustrated in operation, in accordance with various embodiments. In various embodiments, outlet nozzle 734 is similar to outlet nozzle 34 of FIG. 4A, except that outlet nozzle 734 further comprises a bifurcation structure 785 extending from inner wall 752 towards neck 744. In various embodiments, bifurcation structure 785 extends from inner wall 752, past outer wall 750, and into neck 744. In various embodiments, the flow of hot gas 770 may turn approximately ninety-degrees from neck 744 into plenum 754 of head 746. Bifurcation structure 785 may aide in turning the flow of hot gas 770 from neck 744 into plenum 754. In various embodiments, bifurcation structure 785 divides a first flow of hot gas 770a from a second flow of hot gas 770b wherein the first flow of hot gas 770a is directed in a first rotational direction around plenum 754 and the second flow of hot gas 770b is directed in an opposite rotational direction around plenum 754 from that of the first flow of hot gas 770a. In various embodiments, bifurcation structure 785 may be positioned such that the mass flow rate of first flow of hot gas 770a is equal or substantially equal to the mass flow rate of second flow of hot gas 770b. However, it is contemplated herein that bifurcation structure 785 may be positioned such that the mass flow rate of first flow of hot gas 770a is substantially greater than or less than the mass flow rate of second flow of hot gas 770b. In various embodiments, bifurcation structure 785 comprises a wedge-shaped structure extending from inner wall 752.

Figure 8A:
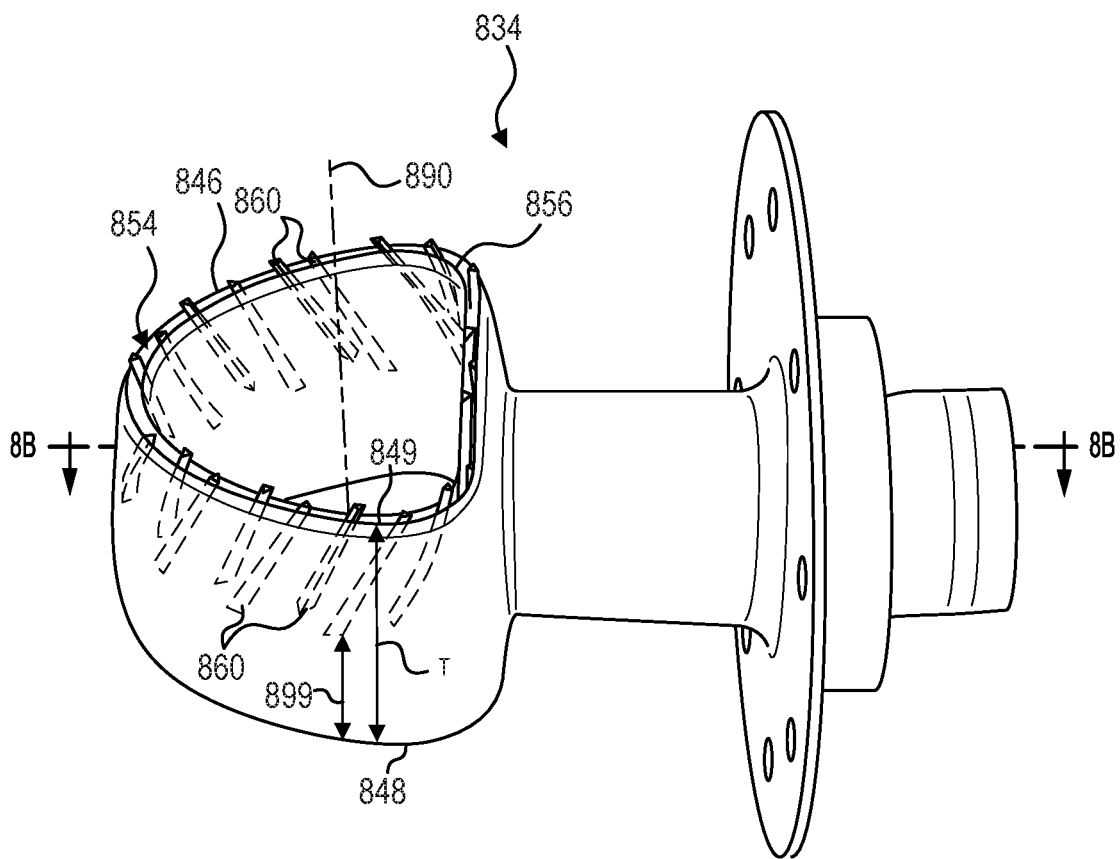
FIG. 8A illustrates a perspective view of an outlet nozzle having a plurality of internal fins disposed in a plenum of the outlet nozzle for imparting a rotational movement on the hot gas flowing through the outlet nozzle, in accordance with various embodiments.
Figure 8B:
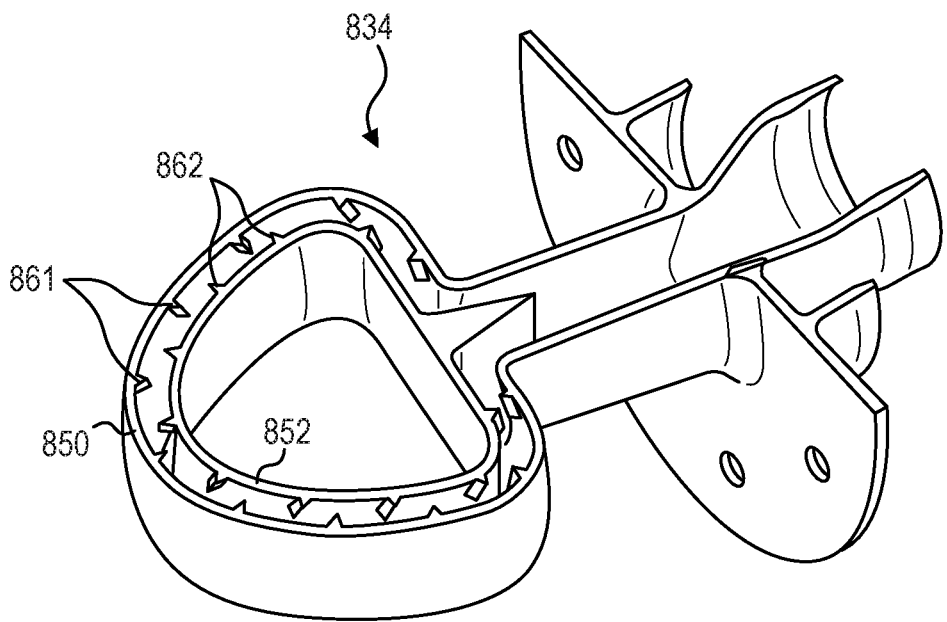
FIG. 8B illustrates a section view of the outlet nozzle of FIG. 8A, in accordance with various embodiments.
Figure 8C:
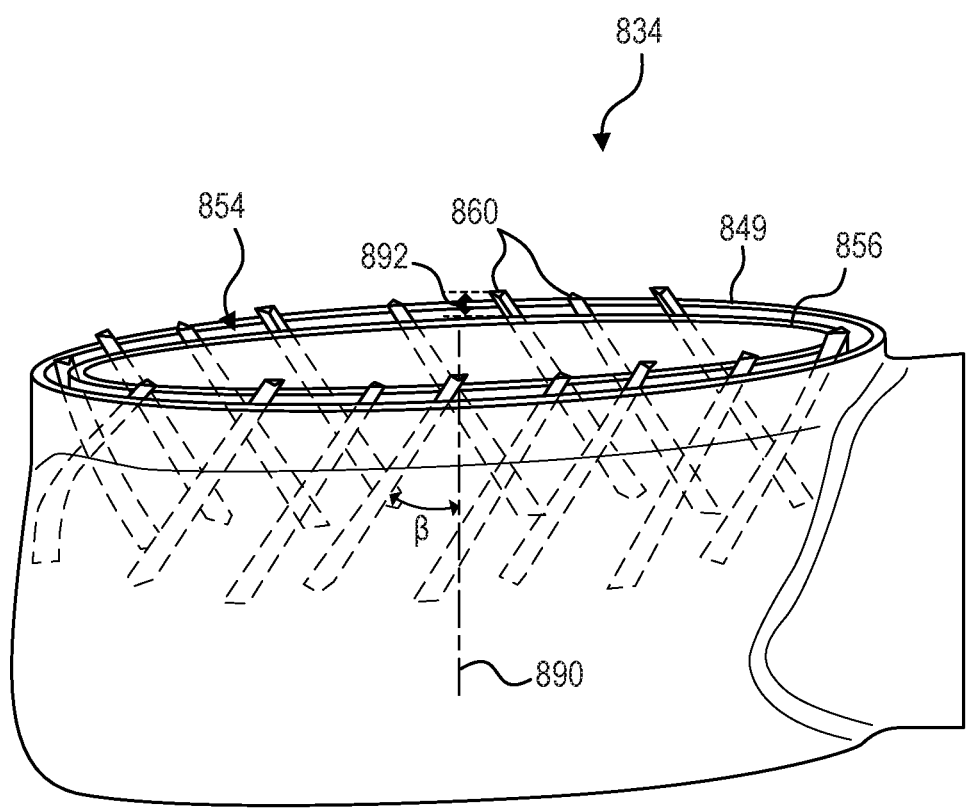
FIG. 8C illustrates a perspective view of the outlet nozzle of FIG. 8A, with the internal fins extending from the plenum, in accordance with various embodiments.

With combined reference to FIG. 8A, FIG. 8B, and FIG. 8C an outlet nozzle 834 is illustrated. In various embodiments, outlet nozzle 834 is similar to outlet nozzle 34 of FIG. 4A, except that outlet nozzle 834 further comprises a plurality of fins 860 disposed in plenum 854. Fins 860 may be angled with respect to the centerline axis 890 of aperture 856 to impart a rotational flow as the hot gas moves through plenum 854 of the outlet nozzle 834. As the hot gas moves inside the outlet nozzle 834 the fins 860 impart a rotational movement to the gas and then eject it out the outlet nozzle 834 to improve mixing with the ambient air.

In various embodiments, fins 860 may be spaced apart from a leading edge 848 of head 846 by a distance 899. Distance 899 may be between one tenth and four fifths of the total linear distance $$T\left(\frac{1}{10}T - \frac{4}{5}T\right)$$

between leading edge 848 and trailing edge 849 of head 846. Distance 899 may be between one eighth and three fourths of the total linear distance $$T\left(\frac{1}{8}T - \frac{3}{4}T\right)$$

between leading edge 848 and trailing edge 849 of head 846. Distance 899 may be between one fourth and three fourths of the total linear distance $$T\left(\frac{1}{4}T - \frac{3}{4}T\right)$$

between leading edge 848 and trailing edge 849 of head 846. In this manner, hot gas is able to travel parametrically around plenum 854 near leading edge 848 without being impeded by fins 860, while the flow of hot gas is turned towards trailing edge 849, via plurality of fins 860, in a rotational direction as it exits plenum 854 at trailing edge 849.

With reference to FIG. 8B, outlet nozzle 834 comprises a first plurality of fins 861 extending from outer wall 850 toward inner wall 852. First plurality of fins 861 may be spaced apart from inner wall 852. In various embodiments, outlet nozzle 834 comprises a second plurality of fins 862 extending from inner wall 852 toward outer wall 850. Second plurality of fins 862 may be spaced apart from outer wall 850.

With reference to FIG. 8C, fins 860 may protrude from plenum 854 by a distance 892. Stated differently, fins 860 may extends past trailing edge 849 by a distance 892. In this manner, fins 860 aid in turning the flow of the hot gas even after the hot gas has exited plenum 854.

In various embodiments, fins 860 may be oriented at an angle β with respect to centerline axis 890. In various embodiments, angle β is between one degree and sixty degrees (1°-60°). In various embodiments, angle β is between five degrees and forty-five degrees (5°-45°). In various embodiments, angle β is between ten degrees and forty degrees (10°-40°).

Figure 9:
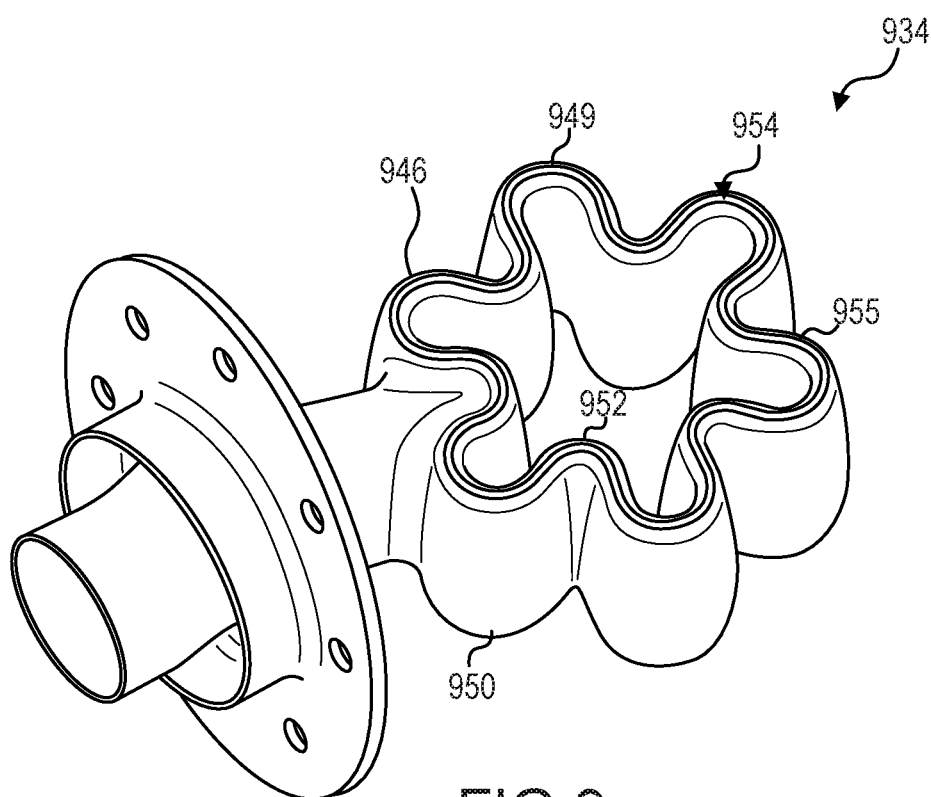
FIG. 9 illustrates a perspective view of a "flower-shaped" outlet nozzle, or an outlet nozzle having a corrugated inner wall and a corrugated outer wall, in accordance with various embodiments.

With reference to FIG. 9, an outlet nozzle 934 is illustrated, in accordance with various embodiments. Outlet nozzle 934 is similar to outlet nozzle 34 of FIG. 4A, except that the inner wall 952 and the outer wall 950 comprise a corrugated geometry to increase the mixing efficiency of the hot gas exiting outlet nozzle 934 with the ambient air. A slit 955 may be formed at the trailing edge 949 of head 946 whereby hot gas exits plenum 954. Inner wall 952 may comprise a corrugated geometry. Outer wall 950 may comprise a corrugated geometry. The geometry of inner wall 952 and outer wall 950 may be complementary to one another such that the slit 955 formed at the trailing edge 949 of head 946 is uniform (i.e., comprises a uniform width) along the perimeter of trailing edge 949 of head 946. In this manner, the geometry of slit 955 may comprises an annular, serpentine shape.

Figure 10:
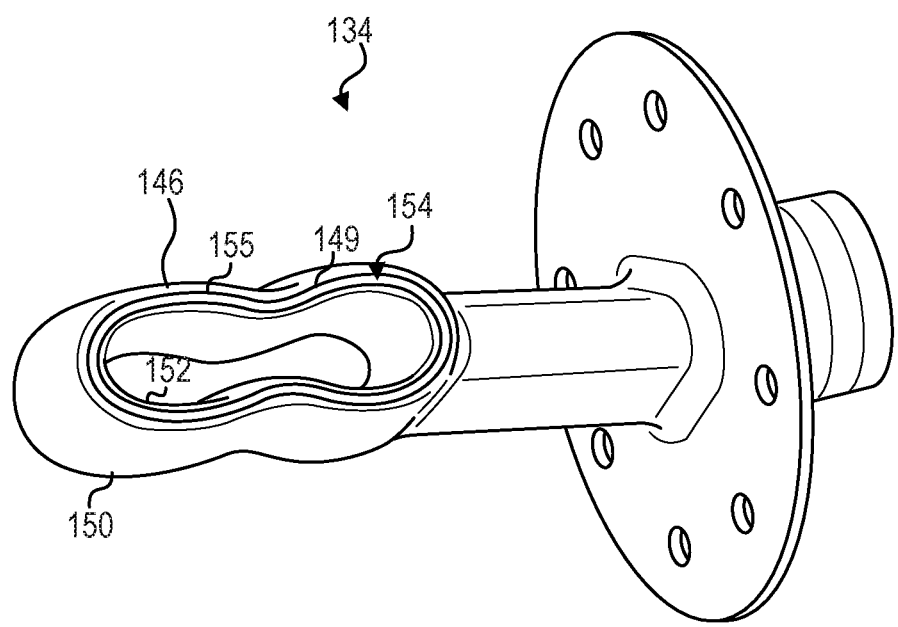
FIG. 10 illustrates a perspective view of an elongated outlet nozzle, in accordance with various embodiments.

With reference to FIG. 10, an outlet nozzle 134 is illustrated, in accordance with various embodiments. Outlet nozzle 134 is similar to outlet nozzle 34 of FIG. 4A, except that the inner wall 152 and the outer wall 150 comprise an elongated geometry with the inner and outer walls 152, 150 curved towards the center of the outlet nozzle 134 to increase the mixing efficiency of the hot gas exiting outlet nozzle 134 with the ambient air. The geometry of the inner wall 152 and the outer wall 150 may be referred to herein as a "peanut shell" geometry. A slit 155 may be formed at the trailing edge 149 of head 146 whereby hot gas exits plenum 154. Outlet nozzle 134 may be configured for an increased length of slit 155, thereby increasing the surface area of hot gas exiting plenum 154 for an increased mixing factor between the hot gas and the ambient air. Furthermore, the elongated geometry of head 146 may permit retrofitting of outlet nozzle 134 through an existing hole in a bulkhead of a nacelle inlet.

Figure 11A:
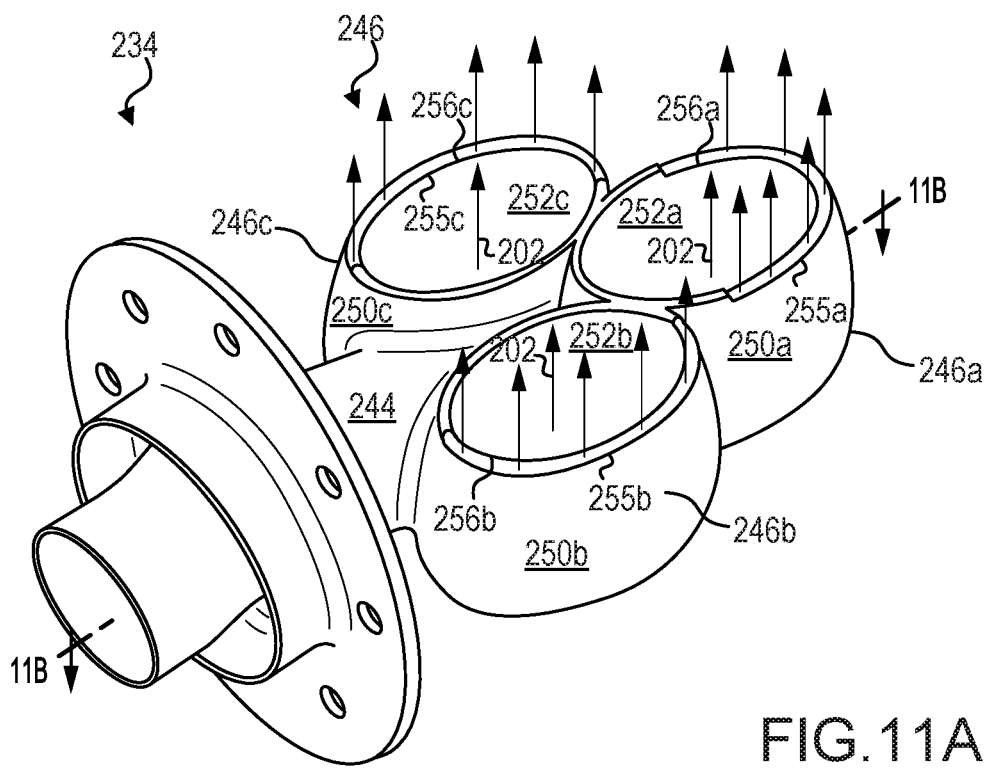
FIG. 11A illustrates a perspective view of an outlet nozzle having a plurality of sub-heads, each sub-head defining an associated through-hole, in accordance with various embodiments.
Figure 11B:
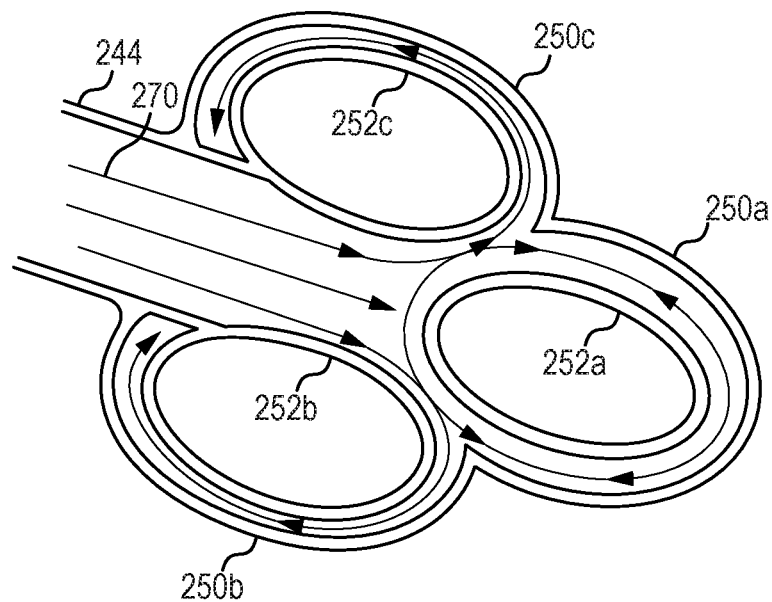
FIG. 11B illustrates a schematic, section view of the outlet nozzle of FIG. 11A, in accordance with various embodiments.

With reference to FIG. 11A and FIG. 11B, an outlet nozzle 234 is illustrated, in accordance with various embodiments. Outlet nozzle 234 is similar to outlet nozzle 34 of FIG. 4A, except that the head 246 of outlet nozzle 234 comprises a plurality of heads (e.g., head 246a, head 246b, and head 246c) configured to receive a hot gas from neck 244. In various embodiments, outlet nozzle 234 comprises a first inner wall 252a, a second inner wall 252b, and a third inner wall 252c. In various embodiments, outlet nozzle 234 comprises a first outer wall 250a, a second outer wall 250b, and a third outer wall 250c. In this regard, each head 246a, 246b, 246c may comprise an outer wall 250a, 250b, 250c, respectively, which intersects the outer wall of an adjacent head. For example, outer wall 250b intersects with outer wall 250a and outer wall 250a intersects with outer wall 250c. The illustrated embodiment shows three heads 246a, 246b, 246c. However, it is contemplated that outlet nozzle 234 may comprise more or less heads.

With reference to FIG. 11B, the hot gas 270 may be directed by inner wall 252b and inner wall 252c towards inner wall 252a. Hot gas 270 may be circulated around each inner wall 252a, 252b, 252c towards associated exit slits 255a, 255b, 255c, respectively. In this regard, ambient air 202 may be directed into a plurality of apertures (e.g., aperture 256a, aperture 256b, and/or aperture 256c) extending through outlet nozzle 234.

Figure 12:
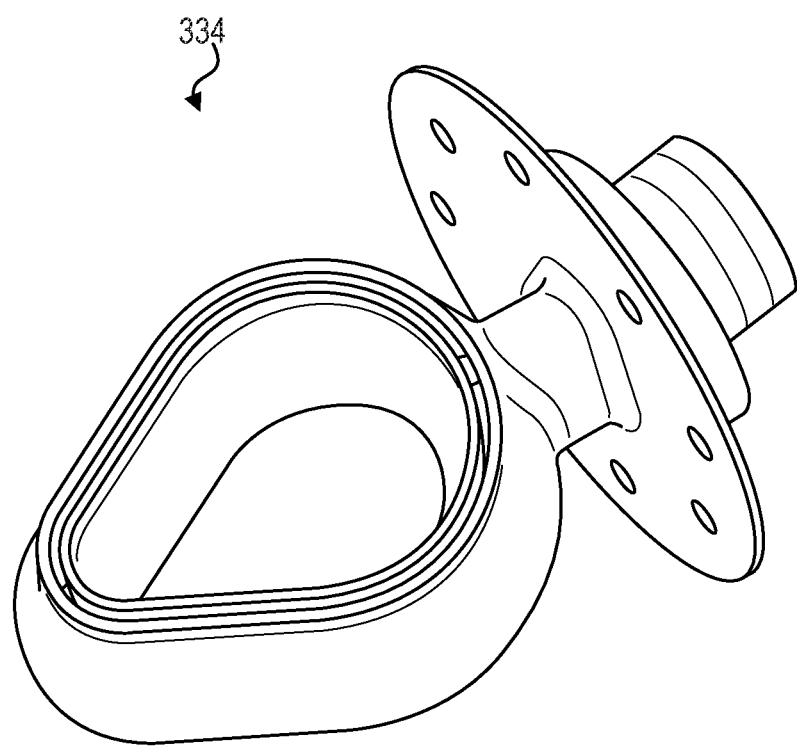
FIG. 12 illustrates a perspective view of a "teardrop-shaped" outlet nozzle, in accordance with various embodiments.
Figure 13:
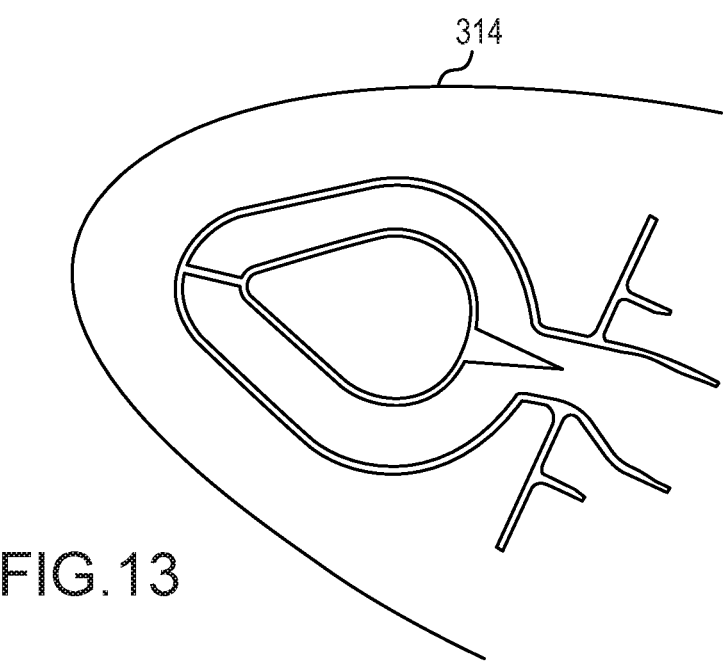
FIG. 13 illustrates a schematic view of the outlet nozzle of FIG. 12 installed in a leading edge housing, the geometry of the outlet nozzle being complementary to the geometry of the leading edge housing, in accordance with various embodiments.

With reference to FIG. 12 and FIG. 13, an outlet nozzle 334 is illustrated, in accordance with various embodiments. Outlet nozzle 334 may be similar to outlet nozzle 34 of FIG. 4A. In various embodiments, outlet nozzle 334 may comprise a geometry which is complementary to that of lip skin 314. In various embodiments, outlet nozzle 334 may comprise a "D" geometry. In various embodiments, outlet nozzle 334 may comprise a teardrop geometry.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus for aircraft anti-icing, the apparatus comprising:
   a nozzle head including an inner wall and an outer wall, the inner wall defining a through-hole extending through the nozzle head, the outer wall circumscribing the inner wall, wherein a plenum is disposed between the inner wall and the outer wall; and
   a neck extending from the outer wall of the nozzle head, the neck configured to supply a flow of hot gas to the plenum, wherein a maximum width of the neck is less than a maximum width of the through-hole;
   wherein the inner wall and the outer wall are both flush with an exit plane of the nozzle head.

2. The apparatus of claim 1, wherein the inner wall and the outer wall each comprise a corrugated geometry.

3. The apparatus of claim 1, further comprising a bifurcation structure extending from the inner wall into the neck, the bifurcation structure configured to divide the flow of hot gas into a first flow of hot gas and a second flow of hot gas, wherein the first flow of hot gas is directed in a first rotational direction around the plenum and the second flow of hot gas is directed in a second rotational direction around the plenum.

4. The apparatus of claim 1, further comprising a plurality of fins disposed in the plenum and extending from at least one of the inner wall and the outer wall, wherein the plurality of fins are configured to impart a rotational flow as the flow of hot gas moves through the plenum.

5. The apparatus of claim 4, wherein the plurality of fins comprises a first plurality of fins extending from the inner wall and a second plurality of fins extending from the outer wall, the first plurality of fins is spaced apart from the outer wall and the second plurality of fins is spaced apart from the inner wall.

6. The apparatus of claim 4, wherein the plurality of fins protrude from the plenum.

7. The apparatus of claim 1, wherein a centerline axis of the nozzle head is oriented at a non-orthogonal angle with respect to the exit plane of the nozzle head.

8. The apparatus of claim 1, further comprising a first lip extending from the inner wall and a second lip extending from the outer wall, the first lip and the second lip configured to turn the flow of hot gas exiting the nozzle head.

9. The apparatus of claim 8, wherein the first lip and the second lip turn the flow of hot gas exiting the nozzle head to be orthogonal to the exit plane of the nozzle head.

10. The apparatus of claim 1, wherein the inner wall and the outer wall comprise an airfoil geometry.

11. The apparatus of claim 1, wherein the neck is configured to receive the flow of hot gas from a compression stage of an engine and the apparatus is configured to provide at least a portion of the flow of hot gas to a leading edge housing of an aircraft component.

12. The apparatus of claim 1, wherein the nozzle head further includes a second inner wall and a second outer wall, the second inner wall defining a second through-hole extending through the nozzle head, the second outer wall circumscribing the second inner wall, and the second outer wall intersecting the outer wall.

13. An aircraft anti-icing system comprising:
   a source of a high temperature gas;
   a housing;
   a conduit configured to carry the high temperature gas from the source to the housing;
   a nozzle coupled to the conduit, the nozzle comprising:
      a nozzle head including an inner wall and an outer wall, the inner wall defining a through-hole extending through the nozzle, the outer wall circumscribing the inner wall, wherein a plenum is disposed between the inner wall and the outer wall; and a neck extending from the outer wall of the nozzle head, the neck configured to supply the high temperature gas to the plenum, and the high temperature gas exits the nozzle via the plenum, wherein a maximum width of the neck is less than a maximum width of the through-hole;

wherein the inner wall and the outer wall are both flush with an exit plane of the nozzle head.

14. The aircraft anti-icing system of claim 13, further comprising a port for exhausting air from the housing, wherein the high temperature gas mixes with air from the housing after the high temperature gas exits the nozzle, and the nozzle is configured to increase a speed of the high temperature gas exiting the nozzle.

15. The aircraft anti-icing system of claim 13, wherein the inner wall is coupled to the outer wall at an upstream end of the nozzle, the high temperature gas exits the nozzle at a downstream end of the nozzle.

16. The aircraft anti-icing system of claim 13, wherein a centerline axis of the nozzle head is orthogonal to the exit plane of the nozzle head, and the exit plane of the nozzle head is oriented at an angle with respect to a direction of a flow of ambient air within the housing at the exit plane.

17. The aircraft anti-icing system of claim 13, wherein a centerline axis of the nozzle head is orthogonal to the exit plane of the nozzle head, and the exit plane of the nozzle head is oriented at an angle with respect to a tangential direction of the housing at the exit plane.

18. The aircraft anti-icing system of claim 13, wherein a centerline axis of the nozzle head is at a non-orthogonal angle with respect to the exit plane of the nozzle head.

19. A method for preventing formation of ice, the method comprising:

receiving, at a nozzle, a hot gas from a compression stage of an engine; and providing, via a nozzle head, the hot gas received from the compression stage to an internal volume of a leading edge housing, wherein the nozzle head provides the hot gas based on a flow pattern, wherein the flow pattern is determined based, at least in part, on a geometry of the nozzle head that has an inner wall and an outer wall, wherein the inner wall defines a through-hole that passes through the nozzle head, and wherein the hot gas passes between the inner wall and the outer wall, wherein a neck extends from the outer wall whereby the nozzle head receives the hot gas, a maximum width of the neck is less than a maximum width of the through-hole, and the inner wall and the outer wall are both flush with an exit plane of the nozzle head.

20. The method of claim 19, further comprising exhausting the hot gas from the leading edge housing.

* * * * *